Patented Feb. 28, 1928.

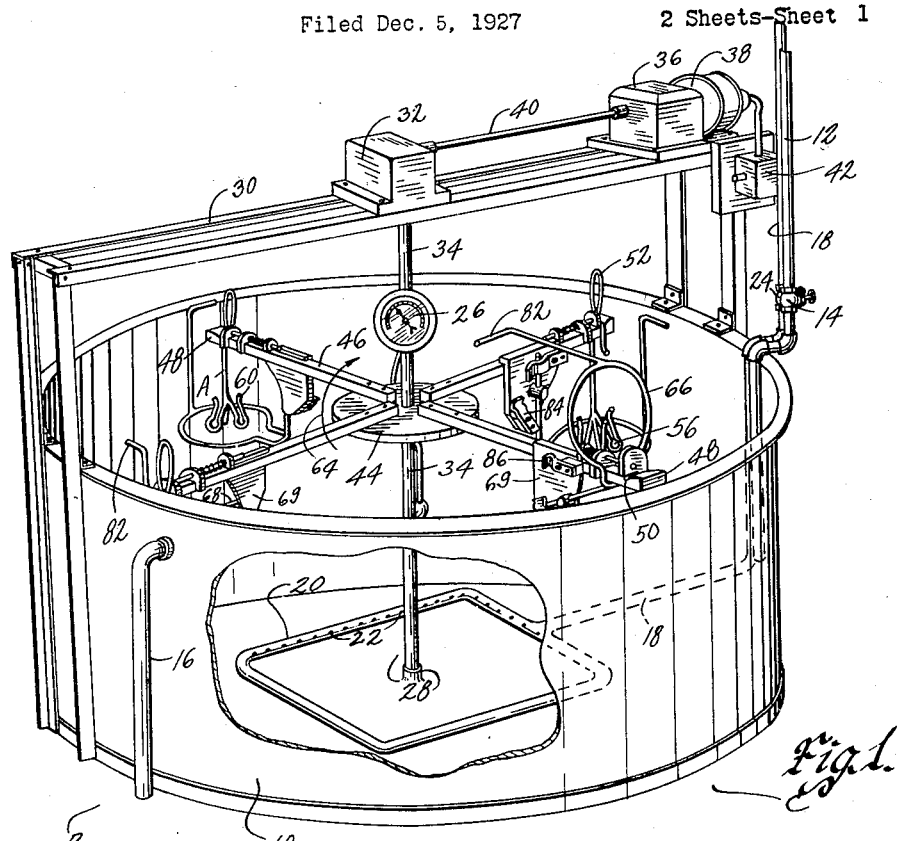
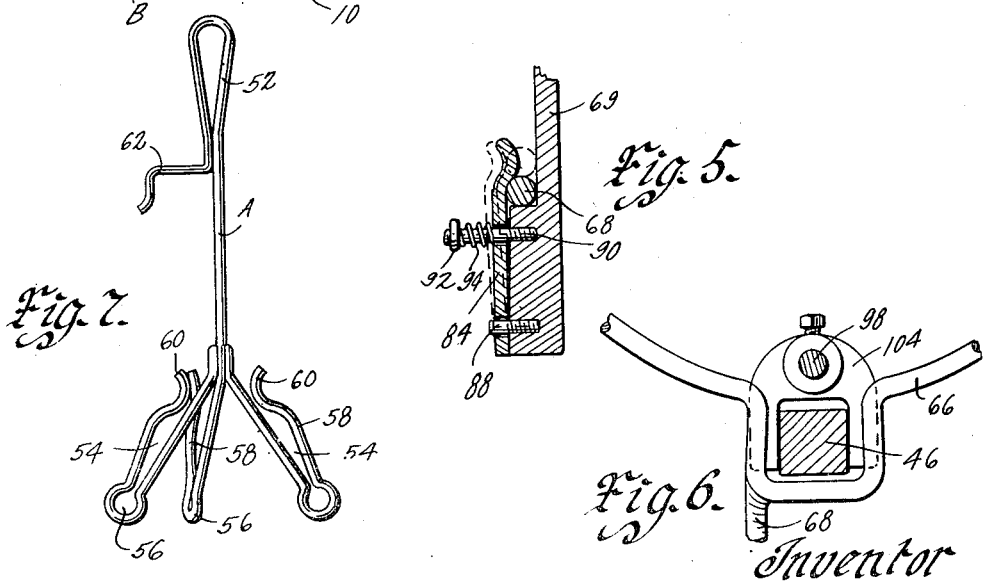

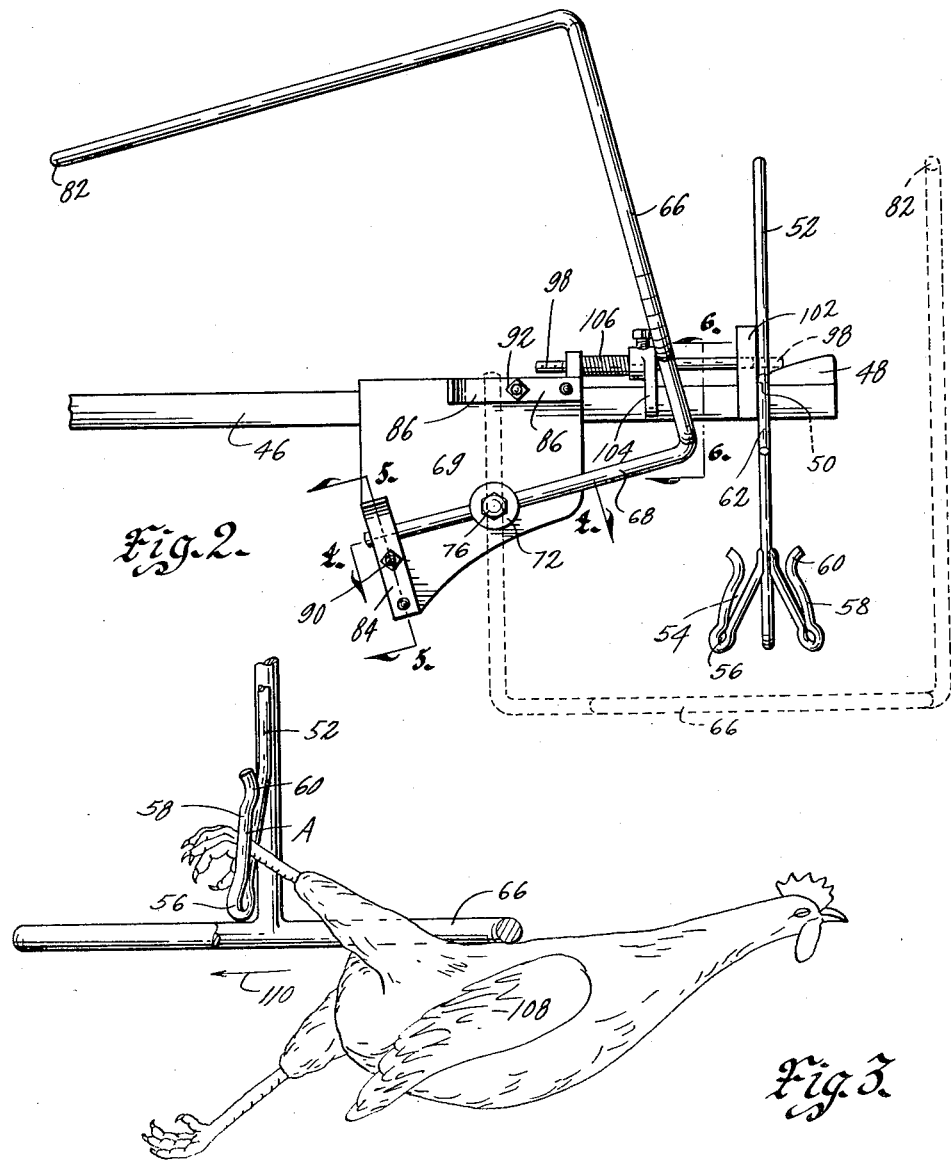

1,660,583

UNITED STATES PATENT OFFICE.

DARIUS E. SHRAUGER, OF ATLANTIC, IOWA.

SCALDING TANK FOR FOWLS.

Application filed December 5, 1927. Serial No. 237,779.

The object of my invention is to provide a scalding tank for fowls of simple, durable, and comparatively inexpensive construction.

A further object of my invention is to provide a scalding machine in which fowls may be conveniently placed and conveniently removed after they have been in the machine a predetermined length of time.

More particularly it is my object to provide a machine of this character in the form of a tank adapted to contain hot water for the purpose of scalding the fowls and a means of suspending the fowls in the water.

Still a further object is to provide the suspending means continuously movable so that after the fowls have been placed in the water they will be carried by the suspending means through the water a predetermined length of time after which they may be removed from the tank.

Still another object is to provide the suspending means in the form of movable arms on which are detachable shackles to hold the fowls with a means which serves in conjunction with the shackle to keep the fowls beneath the surface of the water in the tank.

Still a further object is to provide a means for heating the water in the tank to a predetermined temperature so that the best scalding effect is had.

With these and other objects in view my invention consists in the construction, arrangement and combination of the various parts of my device, whereby the objects contemplated are attained, as hereinafter more fully set forth, pointed out in my claims and illustrated in the accompanying drawings. Although the invention is susceptible of a variety of embodiments, it is unnecessary to fully describe and illustrate more than one in order to give a full understanding of the invention both from its structural and functional standpoints. Accordingly, I have illustrated a preferred and desirable embodiment of the invention in the accompanying drawings in which:

Figure 1 is a perspective view of my improved scalding machine.

Figure 2 is a side elevation of one of the movable arms therein.

Figure 3 illustrates one of the shackles of my device with fowls thereon and shows the action of the machine when in operation.

Figure 4 is an enlarged detail sectional view on the line 4—4 of Figure 2.

Figure 5 is a detail sectional view on the line 5—5 of Figure 2 illustrating a latching mechanism.

Figure 6 is a sectional view on the line 6—6 of Figure 2; and

Figure 7 is a perspective view of one of the shackles used in my machine.

On the accompanying drawings I have used the reference numeral 10 to indicate a tank for containing water. For supplying water to the tank 10 I have shown a water pipe 12 through which the flow of water may be controlled by a valve 14. An overflow pipe 16 is provided on the tank 10 so that the water therein will always be at a predetermined level.

Any convenient means may be provided for heating the water in the tank 10 and I have shown a steam pipe 18 terminating in a rectangular distributing coil 20 at the bottom of the tank 10. The coil 20 is provided with inwardly directed perforations 22 to allow the steam to escape from the coil into the tank and thereby heat the water. The steam through the pipe 18 may be controlled by a valve 24.

Best results are obtained by having the water in the tank 10 at a certain temperature at all times. An automatic temperature controlled valve therefore may be substituted for the valve 24 or a thermometer 26 may be mounted either on the side of the tank 10 or on any of the parts therein. An operator of the machine illustrated in Figure 1 may occasionally look at the thermometer 26 and then manipulate the valve 24 to bring the temperature of the water up to the desired point after it has been cooled off by fowls passing therethrough.

On the bottom of the tank 10 is secured a bearing 28. A frame 30 extends across the top of the tank 10 and is spaced thereabove. A gear box 32 is mounted on the frame 30 and a shaft 34 extends from the box 32 down into the bearing 28. A second gear box 36 is mounted on the frame 30 and an electric motor 38 has its drive shaft extended into the box 36. Suitable worm gearing in the box 36 considerably reduces the speed of the motor 38 so that a shaft 40 extending from the gear box 36 rotates very slowly.

The shaft 40 is connected by any desired type of gearing in the box 32 with the shaft 34. A push button switch 42 for the motor 38 may be provided for starting and stopping the scalding machine.

Secured to the shaft 34 preferably at the water level of the water within the tank 10 is a flange 44. Extending from the flange 44 and supported thereby is a series of arms 46. On the end of each arm 46 is a casting 48 provided with a groove 50.

For use with my machine I provide a series of shackles indicated generally by the reference character A.

Each shackle A comprises a handle portion 52 and three diverging shackle hooks 54. One of the shackle hooks 54 may be formed out of the same material the handle 52 is and the other two may be made of separate pieces welded to the first piece. Each hook 54 includes an enlarged eye 56 and a diverging portion 58 terminating in an outwardly directed hook 60. Each shackle A is adapted to receive a leg of each of three fowls, whereby each hook supports the three fowls. The diverging portion 58 provides for legs of various diameters due to the varying width of the opening in the hook 54 and the hook portion 60 prevents any upward movement of the leg so that the leg is securely held within the shackle hook 54.

Each shackle A is provided with a finger 62 adapted to fit in the groove 50 of the casting 48 whereby the shackle is suspended on the arm 46. The casting 48 has an enlarged end with slanted surface toward the groove 50 so as to direct the finger 62 into the groove.

From the foregoing construction it will be obvious that rotation of the shaft 34 will carry the arms 46 and the shackles A with it so that fowls on the shackle will be drawn through the water in the scalding tank 10. In operation a fowl killer stands at the position indicated at B who kills the fowls, places them on a shackle A and then positions the fowl on the nearest arm 46. The shaft 34 rotates in the direction of the arrow 64 and when the shackle reaches an operator positioned at C this operator removes the fowl from the arm and gives it to the picker. It will thus be seen that the fowls have been moved through three-fourths of a circle and the shackle from the arm 46 has been removed so that the groove 50 is ready to receive another shackle from the hands of the killer. The speed of the shaft 34 is regulated so that the fowls will be in the water of the tank the desired period of time to obtain proper results in the scald.

One of the difficulties in scalding machines has been in providing a readily operated and efficient means for keeping the fowls submerged after they have been killed and placed in the scalding tank. Various means have been tried but where a device is positioned against the fowl to hold it under the water the feathers at the point where the fowl is touched are held against the skin so that water will not penetrate through the feathers to the skin which is very necessary for a good scald. It is necessary to keep the fowls in open water so that nothing touches them and since they are very buoyant after being killed it is necessary to have something to hold them down in the water especially since in the majority of cases the fowls flop around in the water. I have therefore provided a ring 66 which in operative position surrounds the hooks 54 of the shackle A. Each ring 66 is formed on an arm 68 pivotally mounted on a bracket 69 secured to the side of the arm 46. The manner of pivotal connection of the arm 68 is illustrated in Figure 4 of the drawings and comprises a shaft 70 rotatably mounted in a boss 72. The shaft 70 is provided with a head 72 having an opening 74 through which the arm 68 extends. Set screw means 72 is provided to securely position the arm 68 relative to the shaft 70. The shaft 70 is provided with an annular groove 78 into which a set screw 80 extends far enough to prevent removal of the shaft 70 from the box 72 and yet allow rotation of the shaft. On the ring 66 a handle 82 is provided which when the ring 66 is in operative position extends upwardly as shown in dotted lines in Figure 2 of the drawings.

When the ring 66 is in lowered position the free end of the arm 68 is positioned in a resilient clamp 84. When the ring 66 is raised to an inoperative position so that the shackle A may be removed from the arm 46, the free end of the arm 68 is held within a clamp 86. The clamps 84 and 86 are loosely mounted on pins 88 extending from the bracket 69. Bolts 90 also extend from the bracket 69 loosely through the clamp members 84 and 86 and are provided with nuts 92. A spring 94 is positioned on each bolt 90 between the nut 92 and the clamp as best shown in Figure 5 of the drawings. As the ring 22 is moved and the arm 68 is consequently swung into one or the other of the clamps 84 or 86 the clamp bar will assume the dotted line position illustrated in Figure 5 as the arm 68 moves under the hook portion 96 of the clamp. When the arm 68 is in the full line position, the exertions of the fowls on the shackle A while having a tendency to raise the ring 66 will not do so on account of the clamp 86 and yet with a slight pull on the handle 82 the ring 66 may be raised, at the will of the operator.

When the fowls are first placed in the water, their movements have a tendency to raise the shackle A out of the groove 50 and this objection is overcome by providing a locking mechanism for the shackle. The locking mechanism comprises a rod 98 slidably mounted in a flange 100 formed on the bracket 69 and a flange 102 formed on the casting 48. The rod 98 has secured to it by a set screw or equivalent means a flange 104 adapted to fit over the arm 46 and be guided thereby. Between the flange 104 and the flange 100 a spring 106 is interposed for the purpose of constraining the rod 98 to move in one direction. When the spring 106 is free to operate the outwardly directed end of the rod 98 extends over the finger 62 of the shackle A and thereby prevents upward movement of the shackle.

From the construction of the parts just described it will be obvious that just as soon as the ring 66 is started to move into operative or lowered position the shackle A will be locked against upward movement and will not be unlocked until the ring 66 has almost reached the limit of its upward movement to the full line position illustrated in Figure 2.

In Figure 3 I have illustrated the operation of my machine which shows the fowls 108 supported by the shackle A. The relative positions of the fowls and the ring 66 to the shackle shows how any efforts of the fowls to flop their wings and thereby work their way up to the surface of the water only tends to pull their feet more securely into the hooks 54 of the shackle, the ring 66 acting as a fulcrum. The fowls are effectively kept under the surface of the water and the ring 66 being made of only a rod will touch them at but one point and during the operation of the machine the fowls will move around somewhat so that even this one point will not be touched all the time during the travel of the fowls through the water in the tank while they are being scalded. The shackle will be travelling in the direction of the arrow 110 so that the fowls will be drawn backward through the water in which direction their feathers point so that the water will penetrate through the feathers to the skin of the fowl in the most effective manner.

With my machine two men can satisfactorily handle the killing and scalding of fowls and do it in a minimum amount of time. Best results are obtained due to the uniformity of the length of time the fowls are in the water and to the provision I have made for keeping them at all times well submerged beneath the surface of the water.

Changes in construction might be made in a machine of this character without departing from the real spirit and purpose of the invention itself and it is therefore my intention to cover by my claims any modified forms of structure or use of mechanical equivalents, which may be reasonably included within their scope.

I claim as my invention:

1. A scalding machine of the character described comprising a scalding tank, a shackle, means for supporting said shackle in said tank and means adjacent said shackle to prevent the extrication of a fowl's leg from the shackle.

2. A scalding machine of the character described comprising a scalding tank, a shackle, means for supporting said shackle in said tank whereby fowls may be suspended in water in the tank and means adjacent said shackle to prevent the extrication of the fowl's leg from the shackle.

3. A scalding machine comprising a tank for containing water, means in said tank for heating the water therein, a movable member in said tank, a shackle detachably supported on said movable member, means surrounding said shackle for keeping the body of a fowl thereon submerged in the water.

4. A scalding machine comprising a tank for containing water, means in said tank for heating the water therein, a movable member in said tank, a shackle detachably supported on said movable member, a ring adjacent said shackle for keeping fowls thereon submerged in the water in said tank, said ring being pivotally supported on said movable member.

5. A scalding machine comprising a tank for containing water, means in said tank for heating the water therein, a movable member in said tank, a shackle detachably supported on said movable member, a ring adjacent said shackle for keeping fowls thereon submerged in the water in said tank, said ring being pivotally supported on said movable member and capable of movement to operative and inoperative positions and means on said movable member for locking said shackle thereon when said ring is in operative position.

6. A machine of the class described comprising a tank, a movable arm therein, means for causing movement of said movable arm, a shackle, a hook on said shackle adapted to coact with said arm whereby the shackle may be detachably supported on said arm, a ring, an arm thereon, said arm being pivoted to said movable arm whereby said ring may be swung to an inoperative position or to an operative position where, in conjunction with said shackle, it serves to keep a fowl suspended on the shackle and submerged in water in the tank.

7. In a scalding machine, a tank, a shaft journalled in said tank, means for rotating said shaft, an arm secured to said shaft, a shackle detachably secured to the arm, means for maintaining a fowl on said shackle submerged in water in said tank, said means being mounted on said arm and capable of being moved to an inoperative position whereby the shackle with the fowl thereon may be removed from said arm.

8. In a scalding machine, a tank, a shaft journalled in said tank, means for rotating said shaft, an arm secured to said shaft, a shackle detachably secured to the arm, means for maintaining a fowl on said shackle submerged in water in said tank, said means being mounted on said arm and capable of being moved to an inoperative position whereby the shackle with the fowl thereon may be removed from said arm and locking means for said shackle which is rendered inoperative by said last means when the same is moved to inoperative position.

9. In a scalding machine, a tank, a shaft journalled in said tank, means for rotating said shaft, an arm secured to said shaft, a shackle detachably secured to the arm, means for maintaining a fowl on said shackle submerged in water in said tank, said means being mounted on said arm and capable of being moved to an inoperative position whereby the shackle with the fowl thereon may be removed from said arm, and locking means for said last means when in fowl submerging position and when in inoperative position.

10. In a scalding machine, a tank, a shaft journalled in said tank, means for rotating said shaft, an arm secured to said shaft, a shackle detachably secured to the arm, means for maintaining a fowl on said shackle submerged in water in said tank, said means being mounted on said arm and capable of being moved to an inoperative position whereby the shackle with the fowl thereon may be removed from said arm, locking means for said last means when in fowl submerging position and when in inoperative position and latch mechanism for said shackle when said fowl submerging means is in submerging position.

11. A scalding machine comprising a tank for containing water, means in said tank for heating the water therein, a movable member in said tank, a shackle detachably supported on said movable member, said shackle having a wedge shaped slot adapted to fit fowl legs of various sizes and means adjacent said shackle for keeping fowls thereon submerged in water in the tank.

12. A scalding machine comprising a tank, water therein, means for keeping said water at a predetermined temperature, a shaft rotatably mounted in said tank, power means for actuating said shaft, an arm carried by said shaft, means on said arm to receive a shackle, a shackle received by said means, a rod pivoted on said arm and terminating in a loop adapted to surround said shackle and form therewith a means for retaining fowls submerged in the water in said tank.

13. A scalding machine comprising a tank, water therein, means for keeping said water at a predetermined temperature, a shaft rotatably mounted in said tank, power means for actuating said shaft, an arm carried by said shaft, means on said arm to receive a shackle, a shackle received by said means, a rod pivoted on said arm and terminating in a loop adapted to surround said shackle and form therewith a means for retaining fowls submerged in the water in said tank, a latching mechanism adapted to lock said shackle against movement in one direction, said latching mechanism being operative except when said rod and loop are swung to an inoperative position.

14. In a machine of the character disclosed, a tank, a movable arm therein, means for moving said arm, a notch in said arm, a shackle having a hook adapted to be received in said notch, a rod slidably mounted and adapted to coact with said hook and thereby lock the shackle relative to the arm and means associated with said shackle to prevent the removal of a fowl's leg therefrom and to insure submersion of the fowl in water in the tank.

15. In a machine of the character disclosed, a tank, a movable arm therein, means for moving said arm, a notch in said arm, a shackle having a hook adapted to be received in said notch, a rod slidably mounted and adapted to coact with said hook and thereby lock the shackle relative to the arm and means associated with said shackle to prevent the removal of a fowl's leg therefrom and to insure submersion of the fowl in water in the tank, said last means being arranged to slide said rod to an inoperative position whereby the shackle may be removed from said arm.

16. In a machine of the character disclosed, a tank, a movable arm therein, a shackle removably mounted on said arm and a rod associated with said shackle whereby it serves to submerge a fowl suspended from the shackle in water in the tank.

17. In a scalding machine, a tank, water therein, a shaft rotatably mounted in said tank, means for actuating said shaft, an arm supported by said shaft, a notch in said arm, a shackle having a hook received in said notch, an extension on said arm, a rod pivoted to said extension and terminating in a loop adapted to be positioned in association with said shackle to form a fowl submerging means or to be positioned in an inoperative position and friction lock devices adapted to coact with said rod in each of said positions.

18. In a scalding machine, a tank, water therein, a shaft rotatably mounted in said tank, means for actuating said shaft, an arm supported by said shaft, a notch in said arm, a shackle having a hook received in said notch, an extension on said arm, a rod pivoted to said extension and terminating in a loop adapted to be positioned in association with said shackle to form a fowl submerging means or to be positioned in an inoperative position, friction lock devices adapted to coact with said rod in each of said positions and a latch for said shackle when the loop is in fowl submerging position.

19. A scalding machine for fowls comprising a scalding tank, water therein, means for heating the water to a predetermined degree, a shackle, supporting means adapted to move said shackle through the water and means encircling said shackle for causing the body of a fowl suspended thereon to be submerged.

Des Moines, Iowa, November 28, 1927.

DARIUS E. SHRAUGER.